Patented July 26, 1938

2,124,994

UNITED STATES PATENT OFFICE 2,124,994

METHOD FOR THE PREPARATION OF ADHESIVES FROM STARCHY VEGETABLE MATTER

Howard S. Paine, Chevy Chase, Md., and Kyle Ward, Jr., Washington, D. C.; dedicated to the free use of the People of the United States No Drawing. Application March 20, 1937, Serial No. 132,102

2 Claims. (Cl. 134—23.4)

(Granted under the act of March 3, 1883, as amended April 30, 1928; 370 O. G. 757)

This application is made under the act of March 3, 1883, as amended by the act of April 30, 1928, and the invention, if patented, may be manufactured and used by or for the Government for governmental purposes without the payment to us of any royalty thereon.

We hereby dedicate the invention herein described to the free use of the People of the United States to take effect on the granting of a patent to us.

This invention relates to the preparation of adhesives from starchy vegetable matter and to the adhesives so obtained. It relates particularly to adhesives made from the sweet potato and their preparation.

The preparation of adhesives from starch prepared from the white potato is not new and a variety of methods for obtaining this result are known. This includes simple pastes obtained by heating with water, and more complex products obtained by treatment with alkalis, acids, salts, enzymes, etc.

The preparation of satisfactory adhesives from the whole potato, white or sweet, or other starchy vegetable, instead of from the starch has not heretofore been possible, however, due to the presence of various substances which interfere with the desired performance of such adhesives. Proteins, sugars, coloring matter, crude fiber and enzymes are among the undesirable constituents which cause color, rapid spoilage, lumps and other undesirable results in the finished adhesive.

The object of the present invention comprises a process for making adhesives from starchy vegetables in such a manner that the non-starchy constituents do not interfere with the satisfactory application and performance of the adhesives produced.

A further object is the production of desirable adhesives containing the non-starchy materials, or modified derivatives thereof, which are present in the original vegetable matter.

We have found that adhesives satisfactory for certain purposes can be produced from the whole vegetable if a part only of the undesirable constituents be removed or modified. This preliminary treatment may be of various types and the invention is not limited to the types hereinafter described, or to any of them separately. It is particularly applicable to the sweet potato, but is not intended to be limited thereto. If this preliminary treatment has been properly carried out, any method of preparing an adhesive from purified starch may be used on the material thus obtained. The preliminary treatment must be so chosen that the nature and the amount of the substances removed be such as to make possible the preparation of a satisfactory adhesive from the residue. In some cases, such as various types of beans, it is advisable to leave much of the protein matter in the residue, as this actually improves adhesion.

The vegetable matter used may be from several species which contain suitable amounts of starch. It may derive from various parts of the plant, as roots, tubers, bulbs, stock, leaves, fruit, nut, pith or others. This invention is not intended to be limited to any species or any functional type of vegetable life.

Certain preferred methods of producing these adhesives are given in the following examples. These examples are given by way of illustration only and they must not be considered as limiting the invention.

*Example I. Alkaline vegetable glue from the sweet potato.*—Whole sweet potatoes are sliced and air dried, first in a current of warm air, then for a brief period in an oven. They are then ground to a flour. This flour is sifted through a fine sieve. Ten parts of this sifted material are suspended in 20 parts water and heated to 60° C. A solution of 1 part sodium hydroxide in 7 parts water is then added with vigorous stirring. This converts the flour to a homogeneous, translucent brown gel of excellent adhesive properties. The sifting of the flour has removed much peel and crude fiber, which enables one to obtain a smooth homogeneous glue in this fashion.

*Example II. Neutral vegetable glue from the white potato.*—White potato flour is prepared as in the following example, improving the homogeneity by sifting as before. Eleven parts flour are suspended in 22 parts water and heated to 60° C. A solution of 1 part alkali in 7 parts water is added with vigorous stirring. A few drops of phenolphthalein are added and 20% nitric acid is added drop by drop with stirring until the red color disappears. The resulting neutral glue is homogeneous, light in color and exhibits excellent adhesion.

*Example III. Neutral glue from the sweet potato.*—Sweet potatoes are sliced and treated with gasoline vapors. They are then pressed, air-dried, ground and sieved. Of the powdered material obtained in this manner, 10 parts are treated as described in Example I to obtain an alkaline vegetable glue. This is neutralized with 13% HCl, using phenolphthalein as an indicator.

By this treatment, not only is much of the peel and crude fiber removed by sieving, but a certain portion of the water-soluble materials is also removed by pressing. The removal of sugars and diastatic enzyme in this way greatly increases the durability of the resultant product, which is an excellent adhesive.

*Example IV. Salt glue from the sweet potato.*—Sweet potatoes were treated with sulfur dioxide. They were then pressed, dried and powdered as in Example III. Eight parts of this powdered material suspended in an equal weight of water were treated with a solution of three parts calcium chloride in 10 parts water. The mixture was heated one hour with stirring at 60° C. A homogeneous mass was obtained, which was diluted to make an excellent adhesive. The removal of sugars and enzyme by this method helps prevent spoilage of this material.

*Example V. Salt glue from the sweet potato.*—Sweet potatoes were steamed 20 minutes at 15 pounds pressure in an autoclave with a false bottom. The condensate contains water-soluble material from the potatoes, the removal of which improves the quality of the hereinafter described adhesive. In particular, its stability is improved. The cooked potatoes were mashed and dried on a hot double drum dryer. The resulting sheet was powdered and sieved, which removes most of the peel to give a homogeneous yellow powder. Eight parts of this were treated as in the preceding example to give a gel which, diluted with water, is excellent as an adhesive. Since the steaming and the drying with the double drum produces some dextrinization, glues made in this way have lower viscosity and greater solubility in water than the preceding.

*Example VI. Special glue from the sweet potato.*—Sliced sweet potatoes were treated with $SO_2$, pressed, dried, powdered and sieved. Five parts of this powder suspended in 15 parts water at 35° C. were treated with 0.6 part sodium hydroxide dissolved in 1.5 parts water. The resulting alkali glue was neutralized with 17% hydrochloric acid. This vegetable glue was stirred three-fourths hour with 29 parts of the salt glue described in Example IV. This mixture is excellent as an adhesive, homogeneous and light yellow in color.

*Example VII. Salt glue and special glue from the sweet potato with preliminary freezing.*—Sliced sweet potatoes were frozen slowly. After thawing, they were pressed, dried, powdered and sieved. From this powder a salt glue was prepared as in Example IV and a special glue by the method of Example VI. The tan-colored glues so obtained are excellent adhesives.

One advantage of our invention over the prior art is the preparation of suitable adhesives from starchy vegetable matter without the necessity and expense of first extracting and purifying the starch therefrom. Another advantage is the use of such vegetable material in adhesive manufacture without the necessity of complete removal of non-starchy components.

It will be readily seen that different types of adhesive will be necessary for different uses, and it is not intended that this invention be limited to the foregoing examples. It is also evident that the method used in preliminary treatment of vegetables may vary between wide limits and that one or the other treatment may be most suitable for this or that type of adhesive, according to which secondary characteristics of the adhesive, as color, odor, taste, homogeneity, etc., are most important for any particular use. The invention, however, is intended to be limited only as indicated in the appended claims.

Having thus described our invention, what we claim for our Letters Patent is:

We claim:

1. The method of preparing adhesives from starchy vegetables containing fats or fatty oils which consists in subjecting vegetable matter to the action of a gas taken from the group consisting of sulfur dioxide and gasoline vapor, pressing out a part of the water and other constituents of the vegetable, drying the residue, grinding and converting the powder into an adhesive by treatment with starch converting reagents.

2. The method of preparing adhesives from the sweet potato, which consists in steaming the sweet potatoes, drawing off the liquid which contains water-soluble materials originally present, mashing and drying the drained potatoes, grinding and sifting the resulting powder to remove a part of the peel and crude fiber, and thence converting the sifted flour into an adhesive by treatment with starch-converting reagents.

HOWARD S. PAINE.
KYLE WARD, Jr.